Oct. 19, 1948.  C. A. ELLIS  2,451,932
ADJUSTABLE PERIMETER TARGET
Filed June 4, 1945
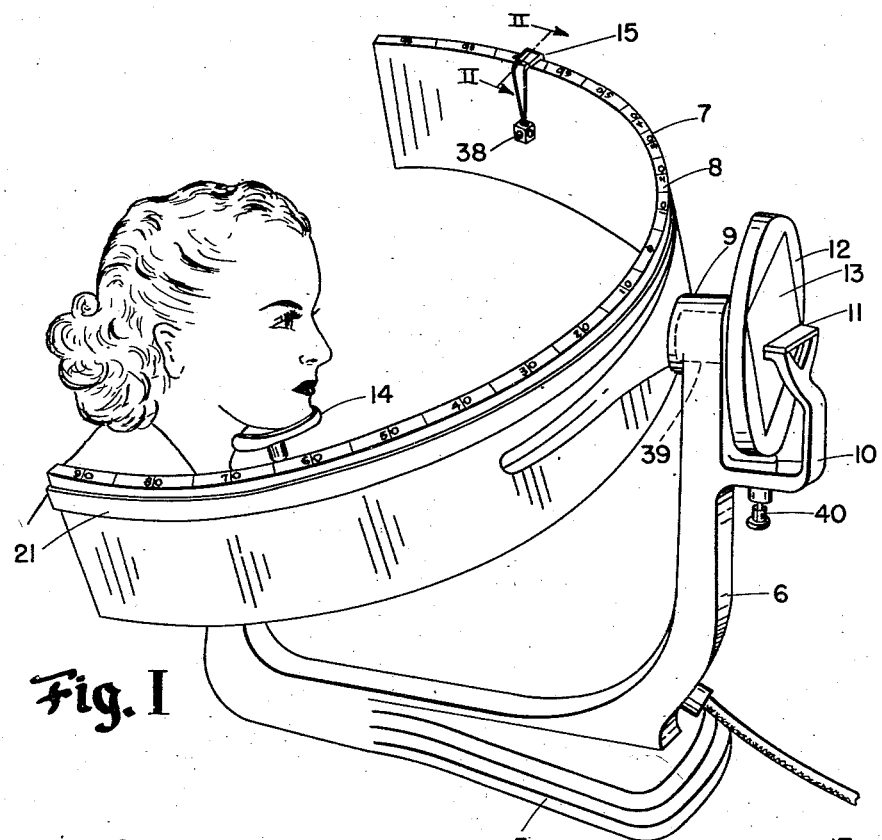
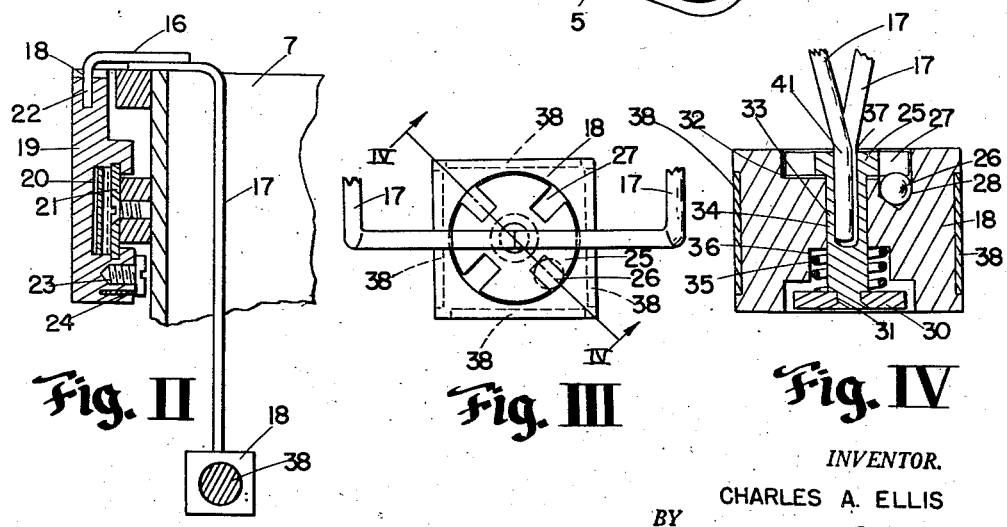
INVENTOR.
CHARLES A. ELLIS
BY
Louis L. Gagnon
ATTORNEY Patented Oct. 19, 1948

2,451,932

UNITED STATES PATENT OFFICE 2,451,932

ADJUSTABLE PERIMETER TARGET

Charles A. Ellis, Southbridge, Mass., assignor to American Optical Company, Southbridge, Mass., a voluntary association of Massachusetts Application June 4, 1945, Serial No. 597,436

3 Claims. (Cl. 88—20)

This invention relates to improvements in eye testing instruments and has particular reference to the provision of novel means for supporting a test object.

One of the principal objects of the invention is to provide novel means for supporting a test object within the field of vision of an eye under test whereby the said means will be substantially invisible to the eye.

Another object is to provide test object supporting means adapted particularly for use in plotting the field of vision of different colors whereby the support means will be substantially invisible to the eye under test and yet insure that the test means is supported in proper adjusted position.

Another object is to provide test object supporting means adapted particularly for use with instruments known in the art as perimeters for plotting the color fields of the eye, which support may be quickly and easily detached from its carrier, will be substantially invisible to the eye under test and which embodies test means of different colors which may be readily adjusted for exposure to the eye under test.

Another object is to provide test means of the above character which is simple in structure and capable of simple hand manipulation for changing from one color to another.

Still another object is to provide test means which may be easily removed from its carrier, thus facilitating efficient means of providing various readily useable test objects for different tests.

Other and further objects will be and will become apparent from the following description taken in connection with the accompanying drawings, and it will be apparent that many changes may be made in the details of construction and arrangement of parts without departing from the spirit of my invention as expressed in the accompanying claims. The exact details shown and described are a preferred embodiment of my invention and are shown by way of illustration only and are not to be considered as limitations.

Referring to the drawings:

Fig. I shows a perspective view of the eye testing device with the target object embodying the invention mounted on the arc thereof;

Fig. II is a partial cross sectional view taken as on line II—II of Fig. I;

Fig. III is a top view of the testing device; and

Fig. IV shows a cross sectional view taken as on line IV—IV of Fig. III.

The present invention relates particularly to an eye testing device commonly known in the ophthalmic profession as a perimeter. Such instruments are employed in determining the extent of the visual field of a patient's eye as to different colors.

In plotting the visual field as to a particular color a test object of that color is slowly moved inwardly of the visual field along given meridinal paths until the outer limit where it is possible for the patient to perceive the color is reached. A notation of this outer limit and meridian is made. These plottings in given meridinal paths are made throughout the complete cycle of 360° thereby giving the complete field of vision as to the particular color of test object employed. These fields are plotted for several different colors which are standard in the ophthalmic art, namely, red, yellow, blue, green, etc.

While plotting these fields the eye under test is fixed on a central fixation object so that it is only the peripheral fields which are plotted. It is extremely essential, during the plotting of said fields that no form character other than the test object is readily visible to the patient's eye as this distracts from the test and introduces inaccurate findings.

Another important feature is that the test means be maintained in proper position of adjustment in order to determine the accurate angle or limit of vision.

Several attempts have been made in the past to provide test means of the above character but in most instances, in order to insure accuracy of position and to simultaneously provide test means employing several different test colors, such devices were extremely cumbersome and employed structural elements which were readily visible and introduced distractions and inaccuracies in the test.

One of the prime objects of the invention, therefore, is to provide simple and efficient means for overcoming all of the disadvantages of the prior art.

Referring to the drawings and particularly to Fig. I, there is shown a characteristic eye testing instrument with which the device embodying the invention is used. This instrument is commercially known in the art as a perimeter adapted for use in plotting the different color fields of the eye. The instrument comprises a base 5 having a support 6 adjacent one end thereof and a chin rest 14 adjacent its opposed end. The chin rest is adapted to support the eye under test substantially at the center of the radius of curvature of the test arcuate arm 7. The test arcuate arm 7 is pivotally supported in the bearing 9 by the pivot shaft 39 and is provided adjacent one of its edges with a scale 8 for determining angular measurements. The pivot shaft 39 has a disc or chart holder 12 secured thereto and adapted to rotate with the movement of the arcuate arm 7. Positioned adjacent the disc 12 and carried by the support 6 is a scale 11 having markings thereon simulating the markings of the scale 8. The chart holder 12 is adapted to support a suitable chart 13 between the holder 12 and the scale 11. The notations of the findings during the test are made on the chart and it is by joining the various recordings that the field is plotted on said chart. This is accomplished in the usual manner.

The arcuate arm 7 is provided with a slideway 21 adjacent the scale 8. The slideway is adapted to support the device 15 embodying the invention. The said device comprises a slide block 19 mounted on the slideway 21 and having a blade spring 20 adapted to frictionally engage the outer side surface of the slideway 21 and further having another blade spring 24 adapted to engage the adjacent edge surface of the slideway 21. The said blade springs 20 and 24 are adapted to resiliently and frictionally support the block 19 in adjusted position. The second blade spring 24 is secured to the block by a screw 23.

The slide block 19 is provided with a slot 18 in its upper surface adapted to receive the angled end 22 of a plate 16 to which the target supports 17 are attached. The said target supports 17 are preferably formed of fine wires secured adjacent the upper ends thereof in spaced relation with each other to the plate 16 and are shaped to converge downwardly toward each other to meeting ends which are secured together as by soldering, welding or the like as illustrated at 41. The end 41 extends within a recess 37 formed in a pin 33 rotatably mounted in the bore 34 of a block 18. The pin 33 is provided with a flange-like head 25 fitting within a recess 32 formed in the top of the block 18 as shown in Fig. IV. The pin 33 is provided adjacent its opposed end with a washer 30 secured thereto by heading over the adjacent end 31 of the pin. Interposed between the washer 30 and lying within a recess 36 formed in the bottom of the block 18 there is a coil spring or the like 35 adapted to urge the head 25 in a direction inwardly of the recess 32. The head 25 is provided with a plurality of diametrically opposed indentations 27 with which a ball 26 seated within a socket 28 formed in the block beneath the head 25 is adapted to interfit under the reaction of the resilient means and thereby function to accurately position the plane of the test object 38 with respect to the plane of the arcuate arm. The side surfaces of the block 18 are each provided with a recessed area in which is seated a colored test object 38. Each of the test objects 38 are of a different color and may be exposed to the eye under test by rotating the block 18 about the pivot pin 33 and are held in said exposed position by means of the ball 26 engaging the aligned indentations 27.

It is to be understood that if more than four differently colored test means are desired, separate supports having blocks 18 thereon carrying differently colored test means 28 may be provided. The support may be readily detached from the slide block 19 by withdrawing the end 22 from the slot 18.

It is particularly pointed out that the converging wirelike members 17 are so dimensioned as to be substantially invisible to the eye under test and due to the converging structure thereof are adapted to rigidly support the test object 38 in proper meridinal position on the arcuate arm 7.

The eye under test, as in conventional practice, is adapted to fix on a fixation object centrally of the arcuate arm 7, that is substantially along the line of the axis of the pivot 39.

In performing the test the holder for the test means is initially positioned adjacent the outer extremities of the arcuate arm so that the test means 38 initially will not be visible to the eye under test. The patient is told to fix on the fixation object at the center of the arcuate arm and to hold the eye in this position. The arm is moved to the meridian in which the initial test is to be made and is held at said meridian by a suitable frictional lock clamp or the like 40. The test object support together with the test means 38 is then moved inwardly along the slideway 21 until the patient reports vision of the test means 38 and this movement is to the outermost limit at which the patient may accurately identify the color under test.

The chart 13 having meridinal lines thereon is then provided with a dot located along the scale 11 at a reading simulating the reading taken on scale 8 as to the position of identification of the test means 38. This is repeated throughout the cycle of 360°.

By joining the dots recorded on the chart 13 it is then possible to plot the peripheral limits of the field of vision as to the particular color under test.

Similar tests are made as to different colors depending upon the particular color fields desired to be tested.

It is to be understood that the eye not under test is to be occluded.

It is to be understood that the end 41 may be for formed as to frictionally clamp within the recesses 37 and the pin 33 or may be rigidly soldered or otherwise connected thereto as desired.

The device embodying the invention may involve changes from the specific disclosure set forth herein and minor changes may readily suggest themselves. The right to make departures from the specification and drawings as disclosed is retained and equivalent parts may be used within the spirit of my invention as defined by the accompanying claims.

Having described my invention I claim:

1. In an eye testing device, the combination of a curved track having a fixation object centrally thereof, a movable carriage mounted on said track, a readily detachable member carried by said carriage, a pair of converging, rigid, fine wire-like members secured adjacent one end thereof, and in spaced relation to each other, to the detachable member, the opposed ends of said wire-like members substantially meeting, a pivot member secured to said substantially meeting ends, a block mounted on said pivot member for rotational movement about the pivot member, and a plurality of test objects on said block, said wire-like members being of a dimension substantially invisible to the eye of an individual under test positioned in front of the device, said eye under test being located substantially at the center of the radius of curvature of the track and having its line of vision fixed on the fixation object.

2. In an eye testing device, the combination of a curved track having a fixation object centrally thereof, a carriage movable on said track, said carriage having a slotted portion therein, a plate member having a portion seated in the slotted portion, a pair of rigid, fine wire-like members secured adjacent one end thereof, and in spaced relation to each other, to the plate member, said wire-like members depending from said plate member in converging relation, the opposed ends of said wire-like members substantially meeting, a pivot member secured to said substantially meeting ends, a rotatable member mounted on said pivot member for rotation about the pivot member and a plurality of test objects on said rotatable member, said wire-like members being of a dimension sustantially invisible to the eye of an individual under test positioned in front of the device, said eye under test being located substantially at the center of the radius of curvature of the track and having its line of vision fixed on the fixation object.

3. In an eye testing device, the combination of a longitudinally curved slideway having a fixation object centrally thereof, a slide block supported for movement along said slideway, a readily detachable member carried by said slide block, a pair of fine, rigid, wire-like members secured adjacent one end thereof, and in spaced relation to each other, to the detachable member, said wire-like members converging toward each other, with the opposed ends thereof substantially meeting, a pivot member secured to said substantially meeting ends, said pivot member having a plurality of indentations at selected locations about its periphery, a block having a recessed portion therein for receiving the pivot member, said block being rotatable about the pivot member and having means thereon for engaging the indentations about the periphery of said pivot member, and a plurality of test objects at spaced locations about the block corresponding to the spacing of the indentations about the periphery of the pivot member, said wire-like members being of a dimension substantially invisible to the eye of an individual under test positioned in front of the device, said eye under test being located substantially at the center of the radius of curvature of the slideway and having its line of vision fixed on the fixation object.

CHARLES A. ELLIS.

REFERENCES CITED

The following references are of record in the file of this patent:

UNITED STATES PATENTS

| Number | Name | Date |
| --- | --- | --- |
| 123,218 | Beers | Jan. 30, 1872 |
| 1,057,932 | Chanal | Apr. 1, 1913 |
| 1,414,173 | Brown | Apr. 25, 1922 |
| 1,468,579 | Scanlon et al. | Sept. 18, 1923 |
| 2,079,112 | Eicheldoerfer | May 4, 1937 |
| 2,316,042 | Beitel, Jr. | Apr. 6, 1943 |